HUGHES & STONECIPHER.
Seed-Planter.
No. 22,652. Patented Jan. 18, 1859.
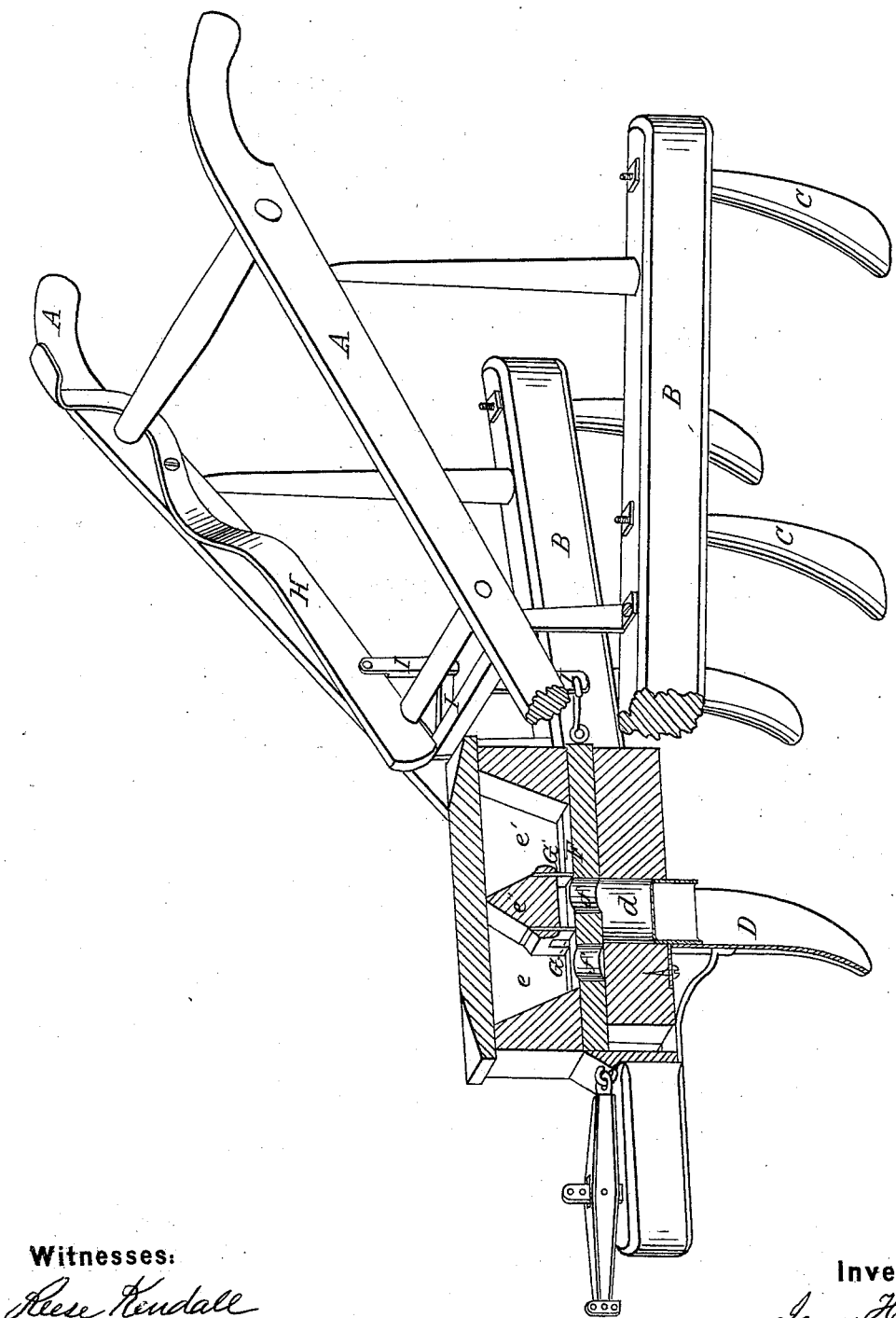
Witnesses:
Reese Kendall
John Richey
Inventor:
James Hughes
N. Stonecipher

UNITED STATES PATENT OFFICE.

JAS. HUGHES AND NATHAN STONECIPHER, OF CAMBRIDGE CITY, IND.

IMPROVEMENT IN CORN-PLANTERS.

Specification forming part of Letters Patent No. 22,652, dated January 18, 1859.

*To all whom it may concern:*

Be it known that we, JAMES HUGHES and NATHAN STONECIPHER, both of Cambridge City, Wayne county, Indiana, have invented a new and useful Improvement in Corn-Planters; and we hereby declare the following to be a full and exact description of the same, reference being had to the accompanying drawing, making part of this specification, in which a machine embodying our improvement is represented in perspective, with the seed-box and its accessories laid open by a longitudinal section.

This invention relates to that class of planters by which the seed is deposited in hills at the option of the operator; and it consists of an improved arrangement of gravitating trigger, reciprocating slide, duplex hopper, &c., by which the labor involved in the manipulation of this class of machines is reduced.

In the illustration here given of our invention A, B, and C represent respectively handles, raves, and cultivator-teeth, of familiar construction.

D is a hollow scorer or drill-tooth, through which seed is deposited, as hereinafter explained.

The seed-box contains two hoppers, $e\ e'$, separated by a partition, $e''$. The slide F has two apertures, $f f'$.

Immediately beneath the center of the partition $e''$ a passage, $d$, leads into the scorer D.

G G' are cut-off brushes of any approved construction.

H is a gravitating trigger, operated by the thumb of the driver so as to impart motion to the slide F by means of suitable connections, I.

The holes $f$ and $f'$, with their charges of grain, are brought alternately over the passage $c$ by the depression and release, respectively, of the trigger, so as to deposit a charge of seed at each motion.

Much inconvenience has been experienced from the rapid motions of the seed-delivering mechanism necessary in machines which deposit seed in but one hill at each pressure of the thumb. By reducing these motions one-half, as above described, we are enabled to plant with greater accuracy and ease to the operator.

We are aware that machines are common which deposit seed in hills by means of a trigger operated by pressure of the thumb, and also that automatic machines exist in which gravity is employed to impart reverse motion to seed-delivering apparatus.

We claim as new and of our invention herein—

The described arrangement of the gravitating trigger H, connecting-rods I, perforated slide F, hoppers $e$ and $e'$, and scorer D, operating, as described, to deposit seed at each pressure and relaxation of the thumb of the driver.

In testimony of which invention we hereunto set our hands.

JAMES HUGHES.
NATHAN STONECIPHER.

Attest:
JAMES M. COCKEFAIR,
JOHN RICHEY.